(12) United States Patent
Brennan et al.

(10) Patent No.: US 9,157,130 B2
(45) Date of Patent: Oct. 13, 2015

(54) RECOVERY OF SUGARS FROM IONIC LIQUID BIOMASS LIQUOR BY SOLVENT EXTRACTION

(75) Inventors: Timothy Charles R. Brennan, Brisbane (AU); Bradley M. Holmes, Oakland, CA (US); Blake A. Simmons, San Francisco, CA (US); Harvey W. Blanch, San Francisco, CA (US)

(73) Assignees: Sandia Corporation, Livermore, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 13/434,714

(22) Filed: Mar. 29, 2012

(65) Prior Publication Data

US 2012/0315695 A1 Dec. 13, 2012

Related U.S. Application Data

(63) Continuation of application No. PCT/US2010/050778, filed on Sep. 29, 2010.

(60) Provisional application No. 61/246,911, filed on Sep. 29, 2009.

(51) Int. Cl.
*C07H 1/06* (2006.01)
*C13B 10/14* (2011.01)
*C13K 1/02* (2006.01)

(52) U.S. Cl.
CPC .............. *C13K 1/02* (2013.01); *A23V 2002/00* (2013.01)

(58) Field of Classification Search
CPC .............. C13K 1/02; C07H 3/02; C07H 3/04
See application file for complete search history.

(56) References Cited

U.S. PATENT DOCUMENTS

| | | | |
|---|---|---|---|
| 2,810,003 | A | 10/1957 | Chervert |
| 6,177,575 | B1 | 1/2001 | Arduengo, III et al. |
| 2003/0154975 | A1 | 8/2003 | Lightner et al. |
| 2003/0207407 | A1 | 11/2003 | Buchanan et al. |
| 2009/0229599 | A1 | 9/2009 | Zhang |

OTHER PUBLICATIONS

Li et al. Green Chem., 2008, 10, 177-182.*
Aziz et al. Separation and Purification Technology 60 (2008) 190-197.*
Berkeley Lab, Lawrence Berkeley National Laboratory, Recovery of Sugars by Solvent Extraction, Sep. 17, 2009.*
Griffin et al. J Chem Technol biotechnol 79:505-511, 2004.*
Brennan et al. Recovery of Sugars from Ionic-Liquid Biomass Liquor by Solvent Extraction, 31st Symposium on Biotechnology for Fuels and Chemicals, May 3, 2009.*
S. S. Y. Tan, D. R. MacFarlane, Ionic Liquids in Biomass Processing Top. Curr. Chem. (2009) 290 311-339.
D. A. Fort, R. C. Remsing, R. P. Swatloski, P. Moyna, G. Moyna, R. D. Rogers, Can ionic liquids dissolve wood? Processing and analysis of lignocellulosic materials with 1-n-butyl-3-methylimidazolium chloride Green Chem. (2007) 9 63-69.
H. Zhao, C. L. Jones, G. A. Baker, S. Xia, O. Olubajo, V. N. Person, Regenerating cellulose from ionic liquids for an accelerated enzymatic hydrolysis J. Biotechnol. (2009) 139 47-54.
N. Sun, M. Rahman, Y. Qin, M. L. Maxim, H. Rodriguez, R. D. Rogers, Complete dissolution and partial delignification of wood in the ionic liquid 1-ethyl-3-methylimidazolium acetate Green Chem. (2009) 11 646-655.
I. Kilpeläinen, H. Xie, A. King, M. Granstrom, S. Heikkinen, D. S. Argyropoulos, Dissolution of Wood in Ionic Liquids J. Agric. Food Chem. (2007) 55 9142-9148.
M. Zayrel, D. Bross, M. Funke, J. Büchs, A. C. Spiess, High-throughput screening for ionic liquids dissolving (lingo-) cellulose Bioresour. Technol. (2009) 100 2580-2587.
Q. Li, Y.-C. He, M. Xian, G. Jun, X. Xu, J.-M. Yang, L.-Z. Li, Improving enzymatic hydrolysis of wheat straw using ionic liquid 1-ethyl-3-methyl imidazolium diethyl phosphate pretreatment Bioresour. Technol. (2009) 100 3570-3575.
Y. Wu, T. Sasaki, S. Irie, K. Sakurai, A novel biomass-ionic liquid platform for the utilization of native chitin Polymer (2008) 49 2321-2327.
H. Xie, S. Li, S. Zhang, Ionic liquids as novel solvents for the dissolution and blending of wool keratin fibers Green Chem. (2005) 7 606-608.
N. Kamiya, Y. Matsushita, M. Hanaki, K. Nakashima, M. Narita, M. Goto, H. Takahashi, Enzymatic in situ saccharification of cellulose in aqueous-ionic liquid media Biotechnol. Lett. (2008) 30 1037-1040.
C. Li, Q. Wang, Z. K. Zhao, Acid in ionic liquid: An efficient system for hydrolysis of lignocellulose Green Chem. (2008) 10 177-182.
M. Mazza, D.-A. Catana, C. Vaca-Garcia, C. Cecutti, Influence of water on the dissolution of cellulose in selected ionic liquids Cellulose (2009) 16 207-215.
H. G. Joglekar, I. Rahman, B. D. Kulkarni, The Path Ahead for Ionic Liquids Chem. Eng. Technol. (2007) 30 No. 7 819-828.
K. E. Gutowski, G. A. Broker, H. D. Willauer, J. G. Huddleston, R. P. Swatloski, J. D. Holbrey, R.D. Rogers, Controlling the Aqueous Miscibility of Ionic Liquids: Aqueous Biphasic Systems of Water-Miscible Ionic Liquids and Water-Structuring Salts for Recycle, Metathesis, and Separations J. Am. Chem. Soc. (2003) 125 6632-6633.
S. Li, C. He, H. Liu, K. Li, F. Liu, Ionic liquid-based aqueous two-phase system, a sample pretreatment procedure prior to high-performance liquid chromatography of opium alkaloids J. Chromatogr. B (2005) 826 58-62.
X. Honglu, S. Tiejun, Wood liquefaction by ionic liquids Holzforschung (2006) 60 509-512.

(Continued)

*Primary Examiner* — Layla Bland
(74) *Attorney, Agent, or Firm* — Robin C. Chiang; Lawrence Berkeley National Laboratory

(57) ABSTRACT

The present invention provides for a composition comprising a solution comprising (a) an ionic liquid (IL) or ionic liquid-aqueous (ILA) phase and (b) an organic phase, wherein the solution comprises a sugar and a boronic acid. The present invention also provides for a method of removing a sugar from a solution, comprising: (a) providing a solution comprising (i) an IL or ILA phase and (ii) an organic phase, wherein the solution comprises an IL, a sugar and a boronic acid; (b) contacting the sugar with the boronic acid to form a sugar-boronic acid complex, (c) separating the organic phase and the aqueous phase, wherein the organic phase contains the sugar-boronic acid complex, and optionally (d) separating the sugar from the organic phase.

36 Claims, 11 Drawing Sheets

(56) References Cited

OTHER PUBLICATIONS

O. Aaltonen, O. Jauhiainen, The preparation of lignocellulosic aerogels from ionic liquid solutions Carbohydr. Polym. (2009) 75 125-129.

J. Kadokawa, M. Murakami, Y. Kaneko, A facile preparation of gel materials from a solution of cellulose in ionic liquid Carbohydr. Res. (2008) 343 769-772.

A. Pinkert, K. N. Marsh, S. Pang, M. P. Staiger, Ionic Liquids and Their Interaction with Cellulose Chem. Rev. (2009) 109 6712-6728.

L. Zhang, J. Han, D. Deng, J. Ji, Selection of ionic liquids as entrainers for separation of water and 2-propanol Fluid Phase Equilib. (2007) 255 179-185.

F. Montañés, A. Olano, E. Ibáez, T. Fornari, Modeling Solubilities of Sugars in Alcohols Based on Original Experimental Data AIChE J. (2007) 53 No. 9 2411-2418.

M. Deng, Q. Zhou, A. Du, J. van Kasteren, Y. Wang, Preparation of nanoporous cellulose foams from cellulose-ionic liquid solutions Mater. Lett (2009) 63 1851-1854.

K. Thammasouk, D. Tandjo, M. H. Penner, Influence of Extractives on the Analysis of Herbaceous Biomass J. Agric. Food Chem. (1997) 45 437-443.

PCT Patent Application No. PCT/US2010/050778, International Preliminary Report on Patentability.

G. J. Griffin, L. Shu, Solvent extraction and purification of sugars from hemicellulose hydrolysates using boronic acid carriers, J. Chem. Technol. Biotechnol. (2004) 79:505-511.

H. A. Aziz, A. H. Kamaruddin, M. Z. A. Bakar, Process optimization studies on solvent extraction with naphthalene-2-boronic acid ion-pairing with trioctylmethylammonium chloride i sugar purification using design of experiments (2008) 60:190-197.

J. B. Binder, R. T. Raines, Fermentable sugars by chemical hydrolysis of biomass, Proc Natl Acad Sci USA (2010) 107 (10): 4516-4521.

\* cited by examiner

US 9,157,130 B2

RECOVERY OF SUGARS FROM IONIC LIQUID BIOMASS LIQUOR BY SOLVENT EXTRACTION

CROSS-REFERENCE TO RELATED APPLICATIONS

This application claims priority as a continuation application to PCT International Patent Application No. PCT/US10/50778, filed Sep. 29, 2010, which claims priority to U.S. Provisional Patent Application Ser. No. 61/246,911, filed Sep. 29, 2009; both of which are hereby incorporated by reference.

STATEMENT OF GOVERNMENTAL SUPPORT

The invention was made with government support under Contract Nos. DE-AC02-05CH11231 awarded by the U.S. Department of Energy. The government has certain rights in the invention.

FIELD OF THE INVENTION

The present invention is in the field of saccharification of biomass using ionic liquid.

BACKGROUND OF THE INVENTION

In recent years there has been tremendous interest and an increasing effort towards the development of biofuels made from lignocellulosic biomass derived from agricultural wastes, forest residues and dedicated energy crops. One of the largest limitations facing the overall economic viability of this process is the recalcitrance of biomass to enzymatic hydrolysis into its component sugars. This resistance to breakdown necessitates the use of a pretreatment step to enhance the accessibility to and hydrolysis of the carbohydrate components present. Most pretreatments are comprised of thermochemical processes that utilize combinations of high temperatures and pressures, or dilute acids or alkalis, to open up the structure of the biomass. This necessitates the use of specialized equipment and high-energy inputs.

Ionic liquids (ILs) have come into prominence over recent years used as innovative fluids for chemical processing. They are known as environmentally friendly solvents primarily due to their low volatility and their potential recyclability. Recently, the use of ILs for the pretreatment of biomass has been shown to be a promising technology, being able to solubilizing crystalline cellulose and biomass under relatively mild conditions. Reconstitution of the biomass from the IL results in an amorphous products that significantly increases the rate of enzymatic hydrolysis to its component sugars. The IL 1-ethyl-3-methylimidazolium acetate [C2Mim][OAc] has been found to be effective at the dissolution of biomass and the subsequent enhancement of enzymatic saccharification.

The ionic liquid pretreatment process can be generally described as the dissolution of biomass into the ionic liquid at temperature with stirring, followed by the addition of a precipitant that precipitates the biomass from solution. This precipitant is typically either water or ethanol or some other solvent with hydrogen bonding capacity. Once the biomass has been precipitated, solid liquid separation, and downstream enzymatic hydrolysis of the now amorphous biomass results in monosaccharides suitable for fermentation.

The proposed deconstruction process contains several steps that present themselves as points for maximizing sugar yields and cleaning up IL's for recycle. After the initial dissolution of the biomass in IL and precipitant addition, subsequent washings are required (Stage B in FIG. 9) for the recovery of amorphous biomass due to the low tolerance of commercial enzyme cocktails to ionic liquids. One possible way to reduce energy costs associated with precipitant removal and clean up, and extensive processing of the regenerated biomass to remove residual ILs is the development of cellulases that can perform optimally in the presence of ionic liquids. Successful development of IL tolerant cellulase provides potential candidates to be utilized for highly efficient deconstruction of biomass into monosaccharides in IL systems.

However, the removal of 5-carbon and 6-carbon monosaccharides from either an IL-free supernatant, pure IL or IL-aqueous solution remains a problem.

SUMMARY OF THE INVENTION

The present invention provides for a composition comprising a solution comprising (a) an ionic liquid (IL) or ionic liquid-aqueous (ILA) phase and (b) an organic phase, wherein the solution comprises a sugar and a boronic acid. The boronic acid can be of a trigonal form or a tetrahedral anion form. In some embodiments of the invention, the sugar and the boronic acid form a sugar-boronic acid complex which is in the organic phase. The boronic acid in the sugar-boronic acid complex is in the tetrahedral anion form. In some embodiments of the invention, the sugar is derived from a biomass feedstock. In some embodiments of the invention, the sugar is derived from the hydrolysis of cellulose.

The present invention provides for a method of removing a sugar from a solution, comprising: (a) providing a solution comprising (i) an ionic liquid (IL) or ionic liquid-aqueous (ILA) phase and (ii) an organic phase, wherein the solution comprises an ionic liquid, a sugar and a boronic acid; (b) contacting the sugar with the boronic acid to form a sugar-boronic acid complex, (c) separating the organic phase and the aqueous phase, wherein the organic phase contains the sugar-boronic acid complex, and optionally (d) separating the sugar from the organic phase.

In some embodiments of the invention, the (a) providing step comprises contacting (i) an IL or ILA solution and an organic solution. In some embodiments of the invention, the IL or ILA solution comprises ionic liquid (IL), a sugar, and a boronic acid.

In some embodiments of the invention, the (d) separating step comprises adding a second IL, ILA, or aqueous solution comprising a stripping agent to the organic solution, such that the sugar-boronic acid complex dissociates and the sugar moves into the second IL, ILA, or aqueous solution. In some embodiments of the invention, the (d) separating step further comprises separating the second IL, ILA, or aqueous solution from the organic phase.

In some embodiments of the invention, the method further comprises culturing a cell using the sugar obtained from the (d) separating step. In some embodiments of the invention, the cell produces a molecule of interest. In some embodiments of the invention, the molecule of interest is a biofuel.

In some embodiments of the invention, the biomass is a cellulose biomass, hemicellulose biomass, ligno-cellulose biomass, or a mixture thereof.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

Figure 1:
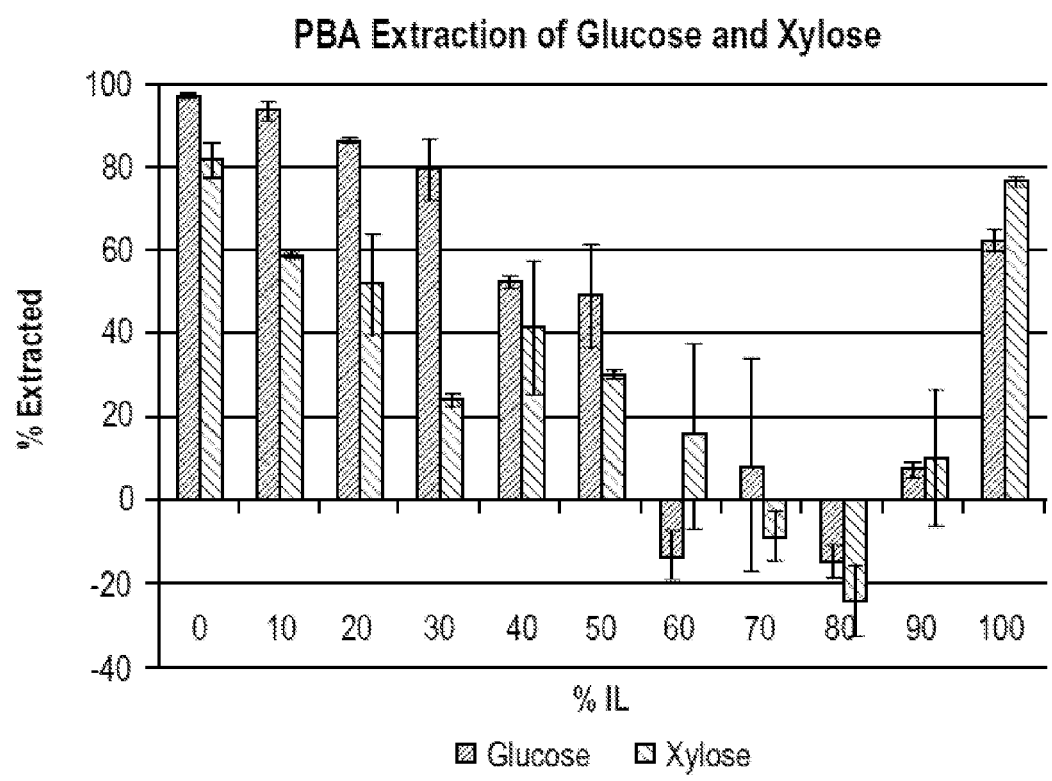
FIG. 1 shows phenylboronic acid extraction for glucose and xylose from aqueous [C2mim][OAC] solutions. PBA has a greater affinity for glucose, and extraction efficiency drops off with increasing IL concentration. At concentrations over 60%, no sugar recovery is observed.

Before the invention is described in detail, it is to be understood that, unless otherwise indicated, this invention is not limited to particular sequences, expression vectors, enzymes, host microorganisms, or processes, as such may vary. It is also to be understood that the terminology used herein is for purposes of describing particular embodiments only, and is not intended to be limiting.

As used in the specification and the appended claims, the singular forms "a," "an," and "the" include plural referents unless the context clearly dictates otherwise. Thus, for example, reference to an "IL" includes a single IL compound as well as a plurality of IL compounds, either the same (e.g., the same molecule) or different.

In this specification and in the claims that follow, reference will be made to a number of terms that shall be defined to have the following meanings:

The terms "optional" or "optionally" as used herein mean that the subsequently described feature or structure may or may not be present, or that the subsequently described event or circumstance may or may not occur, and that the description includes instances where a particular feature or structure is present and instances where the feature or structure is absent, or instances where the event or circumstance occurs and instances where it does not.

When the term "boronic acid" is used, it includes the boronate form.

The present invention provides for a composition comprising a solution comprising (a) an ionic liquid (IL) or ionic liquid-aqueous (ILA) phase and (b) an organic phase, wherein the solution comprises a sugar and a boronic acid. The boronic acid can be of a trigonal form or a tetrahedral anion form. In some embodiments of the invention, the sugar and the boronic acid form a sugar-boronic acid complex which is in the organic phase. The boronic acid in the sugar-boronic acid complex is in the tetrahedral anion form.

The sugars that can be used in this present invention are any sugar that comprises a cis-diol, such as including, but are not limited to, monosaccharides, such as 6-carbon monosaccharides (such as glucose) and 5-carbon monosaccharides (such as xylose), disaccharides, and other complex sugars, such as cellobiose. In some embodiments of the invention, the sugar is derived from a biomass feedstock. In some embodiments of the invention, the sugar is derived from the hydrolysis of cellulose. The hydrolysis of cellulose can be by any suitable cellulase, such as an endoglucanase and/or an exoglucanase. In some embodiments of the invention, the suitable cellulase is a thermostable or thermophilic cellulase, or a mutant thereof. Such suitable cellulases, or mutants thereof, are taught in U.S. Provisional Patent Application Ser. Nos. 61/172,653 and 61/172,668.

In some embodiments of the invention, the IL or ILA phase has a pH of more than about 9. The pH of the IL or ILA phase has to be higher than the pKa of the boronic acid in order for the boronic acid in the IL or ILA phase to form the tetrahedral anion form. In some embodiments, the pH of the IL or ILA phase is equal to or greater than 10, 11, or 12.

Organic Phase

The organic phase comprises any suitable organic molecule, or a mixture thereof, that is immiscible with the IL and ILA solutions, and the organic molecules do not react with the boronic acid and the sugar. A suitable molecule is Aliquat® 336 (commercially available from Cognis Corp., Cincinnati, Ohio), which is a water insoluble quaternary ammonium salt made by the methylation of mixed tri octy/decyl amine.

Ionic Liquid (IL)

The suitable IL that can be used in the present invention can be any IL that does not impede the forming of the sugar-boronic acid complex. In some embodiments of the invention, the IL is suitable for pretreatment of biomass and for the hydrolysis of cellulose by thermostable cellulase. Suitable IL are taught in ChemFiles (2006) 6(9) (which are commercially available from Sigma-Aldrich; Milwaukee, Wis.). Such suitable IL include, 1-alkyl-3-alkylimidazolium alkanate, 1-alkyl-3-alkylimidazolium alkylsulfate, 1-alkyl-3-alkylimidazolium methylsulfonate, 1-alkyl-3-alkylimidazolium hydrogensulfate, 1-alkyl-3-alkylimidazolium thiocyanate, and 1-alkyl-3-alkylimidazolium halide, wherein an "alkyl" is an alkyl group comprising from 1 to 10 carbon atoms, and an "alkanate" is an alkanate comprising from 1 to 10 carbon atoms. In some embodiments, the "alkyl" is an alkyl group comprising from 1 to 4 carbon atoms. In some embodiments, the "alkyl" is a methyl group, ethyl group or butyl group. In some embodiments, the "alkanate" is an alkanate comprising from 1 to 4 carbon atoms. In some embodiments, the "alkanate" is an acetate. In some embodiments, the halide is chloride.

Such suitable IL include, but are limited to, 1-ethyl-3-methylimidazolium acetate (EMIN Acetate), 1-ethyl-3-methylimidazolium chloride (EMIN Cl), 1-ethyl-3-methylimidazolium hydrogensulfate (EMIM $HOSO_3$), 1-ethyl-3-methylimidazolium methylsulfate (EMIM $MeOSO_3$), 1-ethyl-3-methylimidazolium ethylsulfate (EMIM $EtOSO_3$), 1-ethyl-3-methylimidazolium methanesulfonate (EMIM $MeSO_3$), 1-ethyl-3-methylimidazolium tetrachloroaluminate (EMIM $AlCl_4$), 1-ethyl-3-methylimidazolium thiocyanate (EMIM SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM $HOSO_3$), 1-butyl-3-methylimidazolium methanesulfonate (BMIM $MeSO_3$), 1-butyl-3-methylimidazolium methylsulfate (BMIM $MeOSO_3$), 1-butyl-3-methylimidazolium tetrachloroaluminate (BMIM $AlCl_4$), 1-butyl-3-methylimidazolium thiocyanate (BMIM SCN), 1-ethyl-2,3-dimethylimidazolium ethylsulfate (EDIM $EtOSO_3$), Tris(2-hydroxyethyl)methylammonium methylsulfate (MTEOA $MeOSO_3$), 1-methylimidazolium chloride (MIM Cl), 1-methylimidazolium hydrogensulfate (MIM $HOSO_3$), 1,2,4-trimethylpyrazolium methylsulfate, tributylmethylammonium methylsulfate, choline acetate, choline salicylate, and the like. The ionic liquid can comprises one or a mixture of the compounds. Further ILs are taught in U.S. Pat. No. 6,177,575; herein incorporated by reference.

The ionic liquid (IL) is of a concentration of more than 0% to 100% of the composition or solution. In some embodiments, the IL is of a concentration of more than 0% to less than 60% of the composition or solution. In some embodiments, the concentration of IL is equal to or more than 1%, equal to or more than 2%, equal to or more than 3%, equal to or more than 5%, equal to or more than 10%, equal to or more than 15%, or equal to or more than 20%. The upper range of the concentration of IL is less than 60%, or equal to or less than 55%.

In some embodiments of the invention, the IL has a concentration from more than 0% to about 50%. In some embodiments of the invention, the IL has a concentration from more than 0% to about 35%. In some embodiments of the invention, the IL has a concentration from more than 0% to about 20%. In some embodiments of the invention, the IL has a concentration from about 5% to about 20%.

The solution containing IL can further comprise NaCl, such as up to 10 mM of NaCl. The solution can further comprise a suitable buffer.

Boronic Acid

Figure 10:
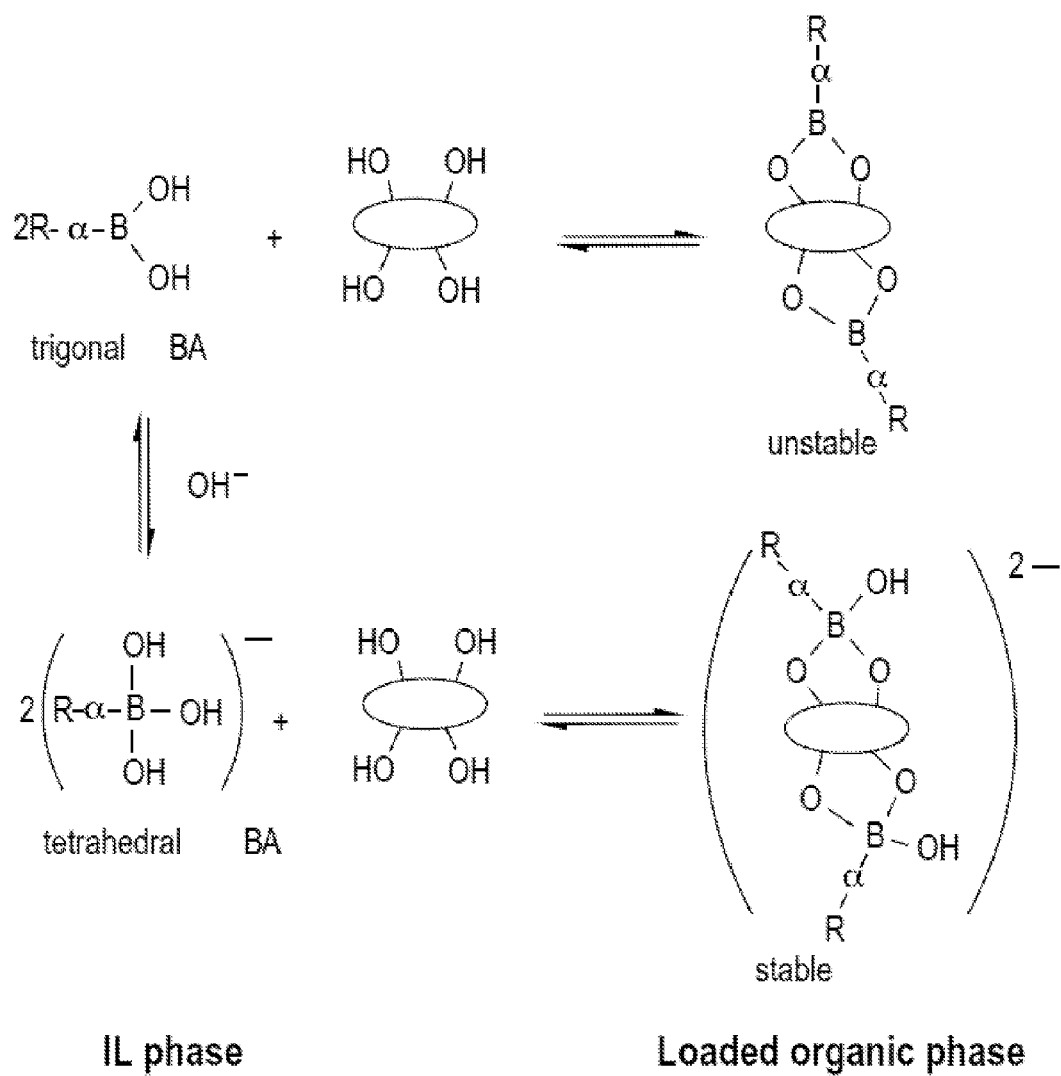
FIG. 10 shows the equilibrium on complex formation between boronate and sugar.

Suitable boronic acids that can be used in the present invention are boronic acids that can form a tetrahedral anion form which can in turn complex with a sugar (see FIG. 10). Such suitable boronic acids include, but are not limited to, boronic acids having the formula: R-α-$B(OH)_2$ (I), wherein α is a bond or an alkyl or alkenyl chain of 1-10 carbons, R comprises at least 1 aromatic ring, wherein optionally at least one ring is substituted by one or more alkyl groups comprising 1-10 carbons. In some embodiments, α is a bond or an alkyl or alkenyl chain of 1-4 carbons. In some embodiments, α is a bond or an alkyl or alkenyl chain of 1-2 carbons. In some embodiments, α is a —C═C—. In some embodiments, R comprises 1, 2, or 3 aromatic rings. In some embodiments, R is a benzene, optionally comprising 1 or 2 methyl groups. In some embodiments, R is a naphthalene.

Such suitable boronic acids include, but are not limited to, phenylboronic acid, 3,5-dimethylphenylboronic acid, 4-tert-butylphenylboronic acid, trans-β-styreneboronic acid, and naphthalene-2-boronic acid.

Methods of the Present Invention

The present invention provides for a method of removing a sugar from a solution, comprising: (a) providing a solution comprising (i) an ionic liquid (IL) or ionic liquid-aqueous (ILA) phase and (ii) an organic phase, wherein the solution comprises an ionic liquid, a sugar and a boronic acid; (b) contacting the sugar with the boronic acid to form a sugar-boronic acid complex, (c) separating the organic phase and the aqueous phase, wherein the organic phase contains the sugar-boronic acid complex, and optionally (d) separating the sugar from the organic phase.

Suitable stripping agent include acids which decrease the pH of the solution, such as an acid, such as inorganic acid, such as HCl.

In some embodiments of the invention, the (a) providing step comprises contacting (i) an IL or ILA solution and an organic solution. In some embodiments of the invention, the IL or ILA solution comprises an ionic liquid (IL) and the sugar. In some embodiments of the invention, the organic solution comprises the boronic acid. In some embodiments of the invention, the organic solution further comprises organic solvents which ensure the boronic acid is fully dissolved in the organic phase, such as n-hexane and 1-octanol, or a mixture thereof (such as n-hexane/1-octanol, 85:5, v/v).

In some embodiments of the invention, the (b) contacting step comprises having the sugar and the boronic acid in the solution to essentially come to equilibrium. In some embodiments of the invention, the (b) contacting step comprises increasing the contact between the sugar in the IL or ILA phase and the boronic acid in the organic phase, such as shaking, agitating, swirling, mixing, or any mechanical means of increasing the surface area of the interface between the IL or ILA phase and the organic phase. Sugars that complex with the boronic acid move into the organic phase.

In some embodiments of the invention, the (d) separating step comprises adding a second IL, ILA, or aqueous solution comprising a stripping agent to the organic solution, such that the sugar-boronic acid complex dissociates and the sugar moves into the second IL, ILA, or aqueous solution. In some embodiments of the invention, the (d) separating step further comprises separating the second IL, ILA, or aqueous solution from the organic phase.

In some embodiments of the invention, the (d) separating step comprises increasing the contact between the second IL, ILA, or aqueous phase and the organic phase, such as shaking, agitating, swirling, mixing, or any mechanical means of increasing the surface area of the interface between the second IL, ILA, or aqueous phase and the organic phase. Sugars that disassociate from the sugar-boronic acid complex move into the IL, ILA, or aqueous phase.

In some embodiments of the invention, the method further comprises culturing a cell using the sugar obtained from the (d) separating step. In some embodiments of the invention, the cell produces a molecule of interest. In some embodiments of the invention, the molecule of interest is a biofuel.

In some embodiments of the invention, the biomass is a cellulose biomass, hemicellulose biomass, ligno-cellulose biomass, or a mixture thereof. The biomass can be an untreated or treated biomass.

Applications

The present invention can be used in the extraction of sugars from biomass. The sugars can be used in all process that use 6-carbon sugars, such as glucose, and the resulting sugars can be used for any intended purpose. The process is of significant interest in biomass processing or biofuels and other biomaterials, paper recycling and pulp processing for paper manufacturing.

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

EXAMPLE 1

Boronic Acid Extraction of Sugars from Pure Ionic Liquid and Ionic Liquid-Water Systems Pretreatment of cellulosic biomass is necessary for its enhanced accessibility and digestibility by enzymes into fermentable sugars. The dissolution of biomass into ionic liquids (ILs) has been shown to be a promising alternative pretreatment technology, facilitating faster breakdown of cellulose into monomeric sugars, either enzymatically or through chemical catalysis. However, the miscibility of both the ILs that dissolve biomass and sugars in water is a potential challenge to the development of an IL based pretreatment process as there has to be a high percentage recovery of both in order for the process to be feasible. To address this challenge solvent extraction technology, based on the chemical affinity of boronates such as phenylboronic acid (PBA) and naphthalene-2-boronic acid (N2B) to complex sugars, is applied to the extraction of glucose, xylose and cellobiose from aqueous solutions of 1-ethyl-3-methylimidazolium acetate ([C2Mim][OAc]), enzymatic hydrolysates from [C2Mim][OAc] pretreated corn stover and 100% [C2Mim][OAc]. It is shown that boronate complexes are effective at extracting sugars from both aqueous solutions of the IL and 100% IL systems. Significantly, cellobiose is only able to be extracted from the 100% [C2Mim][OAc]. This technique shows much potential as a way to recover sugars at several points in ionic-liquid biomass pre-treatment process, delivering a concentrated solution of fermentable sugars, minimizing toxic byproducts and facilitating ionic liquid cleanup and recyclability.

In this study, boronic acid extraction technology is applied pure IL and IL/water based systems to determine if similar successes of sugar recovery can be achieved in an ionic liquid-hydrolysate solution suitable for direct fermentation. Furthermore, ionic liquid loss and degradation is studied for IL recyclability options.

Figure 9:
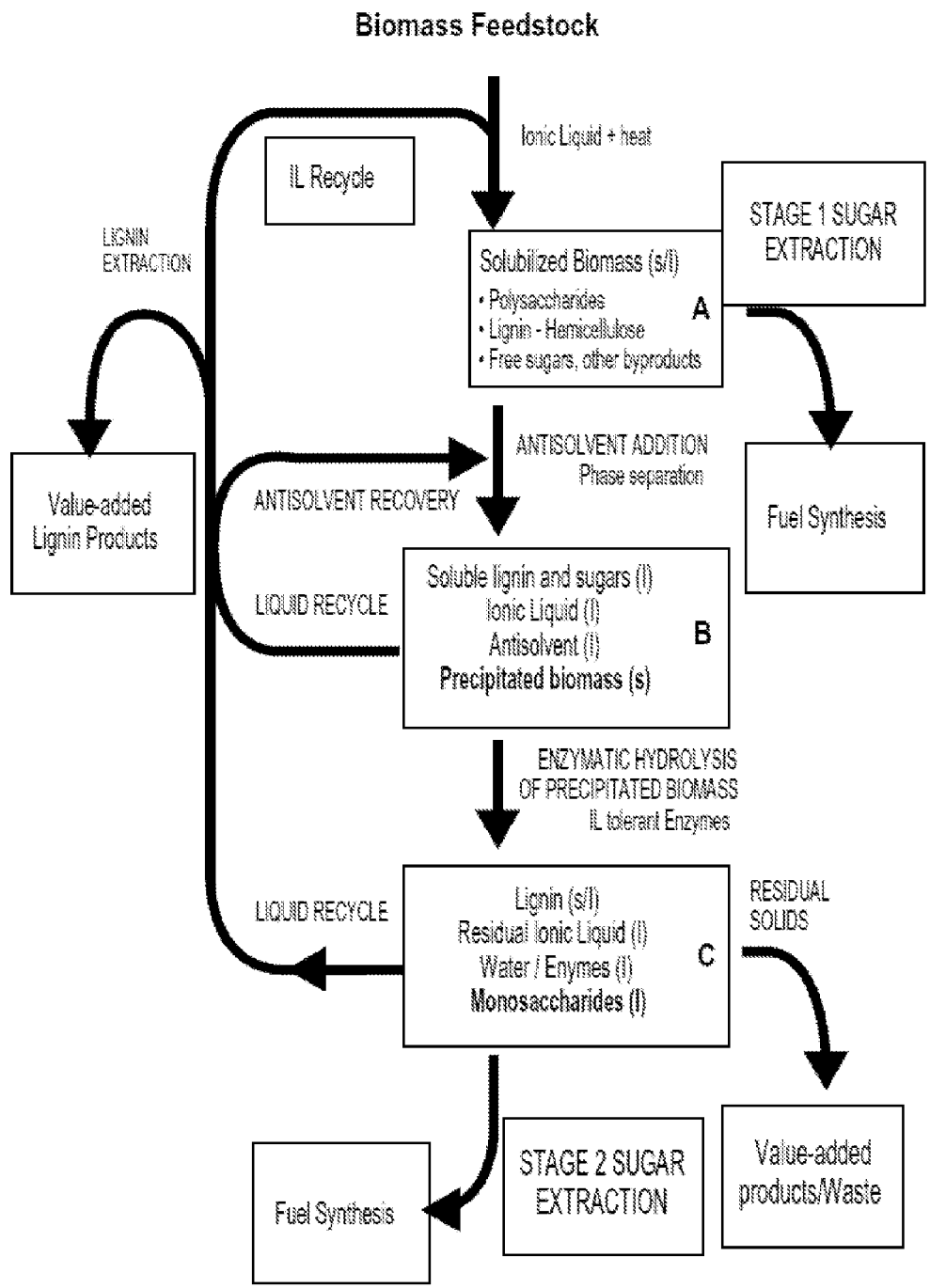
FIG. 9 shows pre-treatment of biomass into fermentable sugars process flow diagram and sugar recovery applications I and II.

Successful development of IL tolerant cellulase provides potential candidates to be utilized for highly efficient deconstruction of biomass into monosaccharides in IL systems. However, the removal of 5-carbon and 6-carbon monosaccharides from either an IL-free supernatant, pure IL or IL-aqueous solution remains a problem. One way to overcome this would be to use liquid-liquid extraction to recover the sugars directly from the IL biomass liquor and then recycle the now—sugar stripped ionic liquid—to previous processing steps. Lipophilic boronic acids, which are the best known extractants for the extraction of sugars from aqueous solutions have never previously been applied to a pure ionic liquid or ionic liquid-aqueous solution. This extraction technology within IL systems is the focus of this study and can be utilized for the removal of sugars in two key stages in the proposed overall deconstruction process (FIG. 9). The first (Stage 1 in FIG. 9) is the recovery of sugars from the initial 100% IL treatment of biomass into dissolved polysaccharides; lignin-hemicellulose, free sugars and biproducts (Stage A). Any free residual sugars that are soluble in this highly concentrated IL system can be recovered and used for fuel synthesis with boronic acid solvent extraction technology. After the addition of precipitants to the dissolve biomass (from step A to B) the precipitated amorphous solids can then be treated with IL tolerant enzymes for further hydrolysis (step B to C) resulting in significant amounts of soluble monosaccharides (stage C). Here the second sugar extraction (Stage 2) can then be utilized for the removal of sugars from stage C that may contain varying amounts of residual ILs, lignin, enzymes, and water for fermentation and subsequent fuel synthesis.

In both applications (Stage 1 or 2) boronic acid sugar recovery allows for the direct removal of sugars from pre-treated IL biomass liquors that would previously require multiple washing steps that could result in loss of solvents and soluble sugars. Additionally, the immiscibility properties that IL and IL/water solutions have with lipophilic organic solutions (containing boronic acids) allows for direct removal of sugars from IL systems without contaminating the IL phase. This renders processing options for reuse and recyclability of the ionic liquid itself that ultimately can lead towards a more economically viable deconstruction process.

Boronic acid extractants have been shown to effectively remove monosaccharides from aqueous solutions, as well as from wood hydrolysates, into an immiscible organic phase. The mechanism in the removal of sugars from an aqueous phase into the organic phase is formation of a tetrahedral anion at the interface of the two immiscible solutions. The boronic acid, naphthalene-2-boronic acid (N2B) in Equation 1, forms a tetrahedral anion under basic conditions. A pH (11-12) above the $pK_a$ of boronic acids (~9) is required in the aqueous phase for the formation of the tetrahedral anion and the most effective removal of sugars.

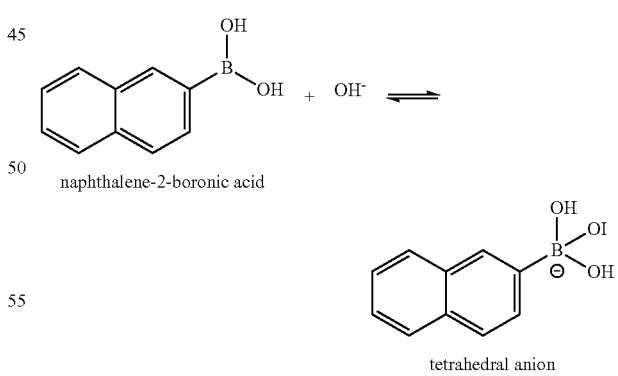

Equation 1: Formation of the N2B tetrahedral ion under basic conditions

At the interface, the tetrahedral anion forms a complex with the cis-diols of 5-carbon and 6-carbon sugar molecules (i.e. glucose and xylose). This anion-sugar complex is then dissolved in the organic phase forming an ion pair with a lipophilic quaternary cation (Aliquat®336, Q+ in Equation 2). The reaction in Equation 2 is reversible under acidic conditions resulting in the release of the sugar from the boronic acid-sugar complex (Equation 3).

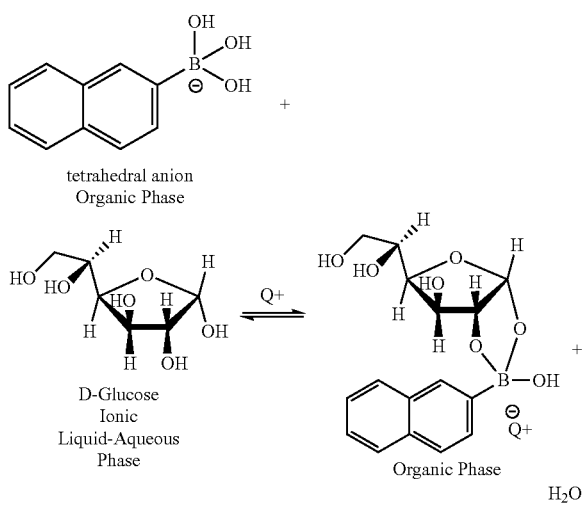

Equation 2: Tetrahedral boronate anion forms a complex with the cis-diol moiety of the carbohydrate. D-glucose in the α-Furanose form is shown.

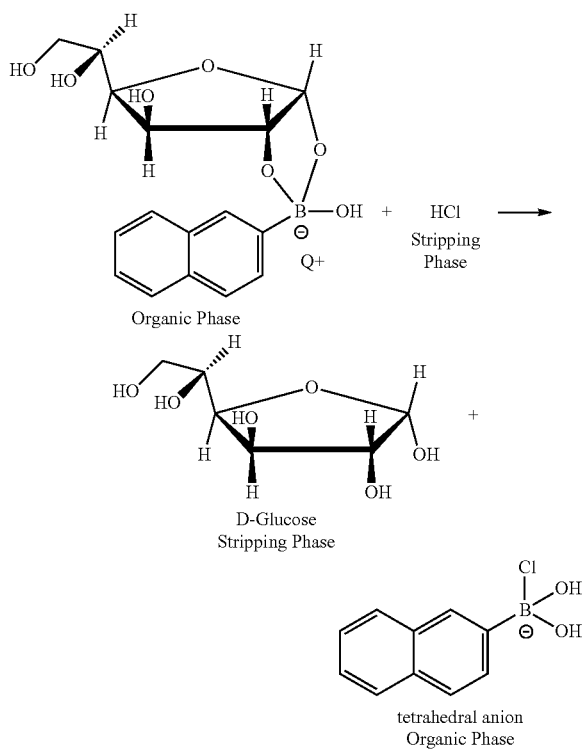

Equation 3: Possible mechanism for the stripping of sugars from the tetrahedral boronate complex using a HCl.

Figure 12:
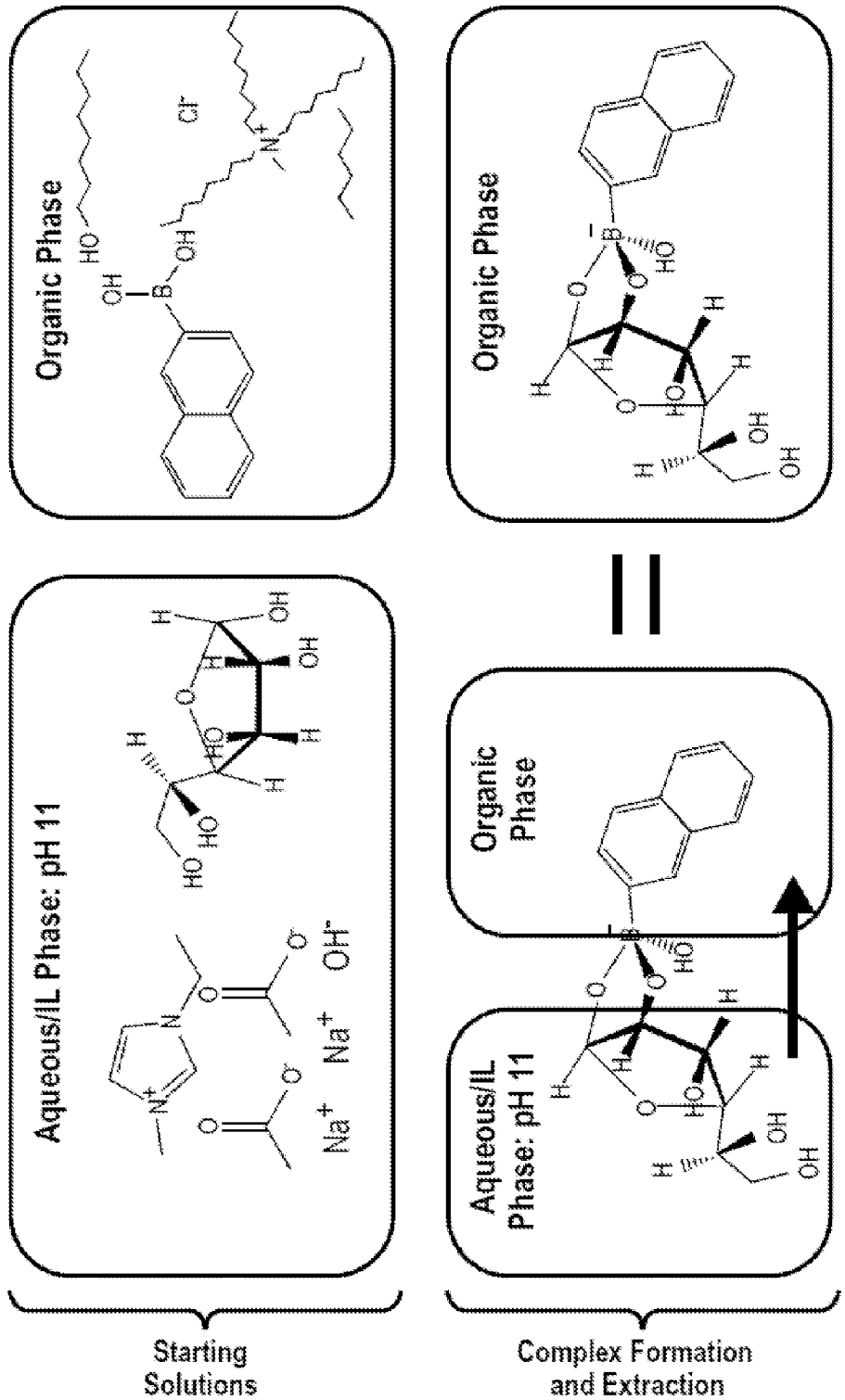
FIG. 12 shows the extraction flow sheet and corresponding substances in each phase.
Figure 12:
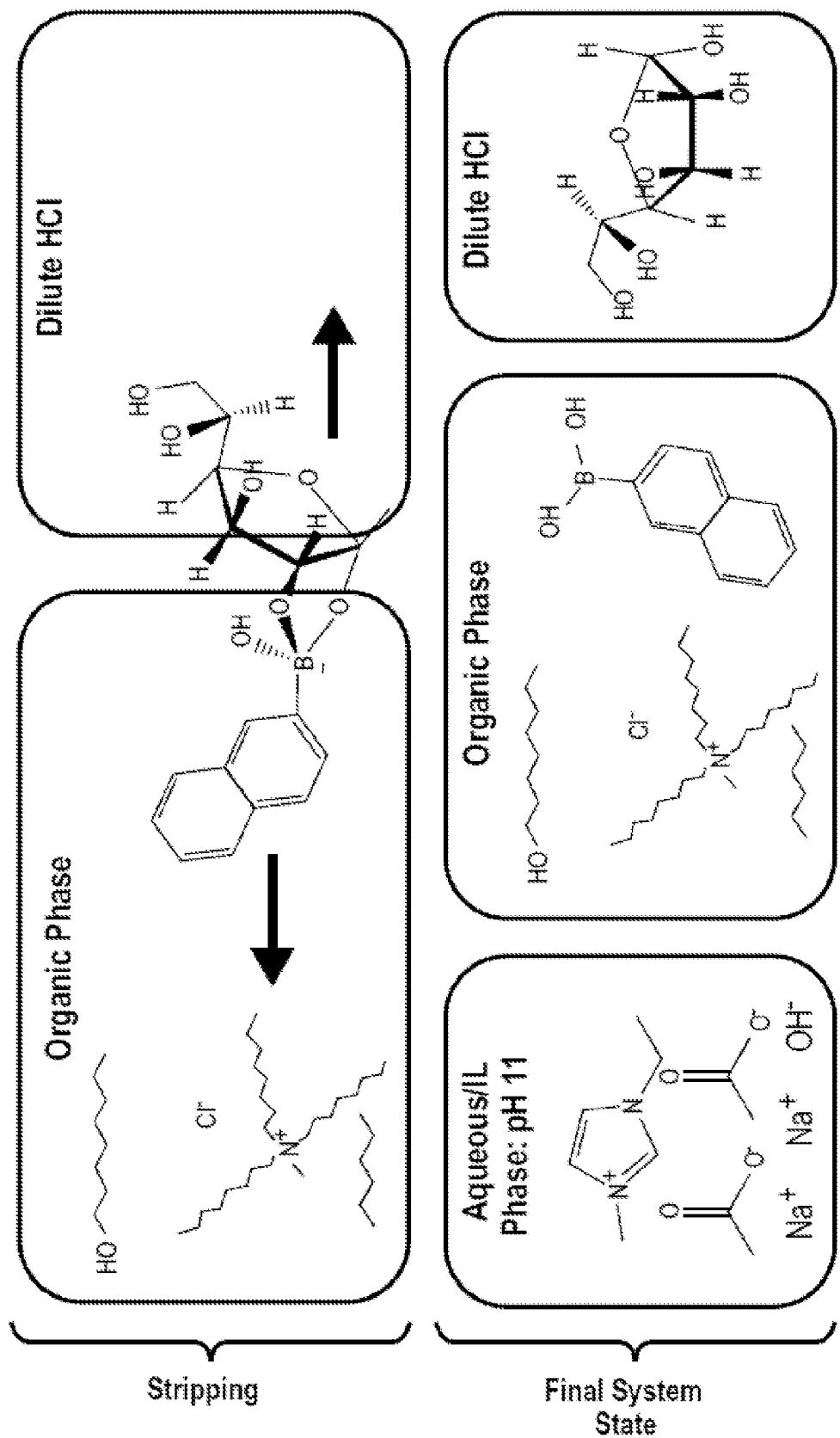

FIG. 12 illustrates an example of the overall process. In the specific example described herein, the use of boronic acids to extract glucose, xylose, and cellobiose from aqueous IL solutions and from ionic liquidonly systems is investigated to determine the efficiency of sugar recovery in the presence of IL. Ionic liquid loss, and degradation is also investigated.

Materials and Experimental Methods

Ionic Liquid Sugar Solutions.

Ionic liquid/water solutions are prepared using specified volumes of 1-ethyl-3-methylimidazolium acetate, (Sigma-Aldrich, BASF Quality, >=90%) and 0.15 M NaHCO$_3$ buffer, pH 11 (Mallinckrodt Chemicals, 99.7-100.3%). The 0.15 M NaHCO$_3$ buffer is prepared by the dissolution of 1.26 g NaHCO3 buffer in 100 ml of water and adjustment of the pH to 11 using NaOH. Trials are conducted using 0 to 100% v[C2mim][OAc]/v[Buffer] containing 10 mM synthetic anhydrous D-glucose, xylose or cellobiose (98% Sigma-Aldrich) in a total volume of 5 ml. In addition to 100% IL-sugar solution, a trial of 100% IL is spiked with 5 μL (total volume of IL-sugar is 5 ml before extraction experiment) of 10 N NaOH (VWR Cat. No. VW3247-1) to test if additional hydroxide increased sugar extraction. (The specified concentration of water in [C2mim][OAc] as received from the supplier was <0.2%. The addition of 5 μl of NaOH represents approximately 0.1% increase in water content and so is treated as negligible.) The pH of initial IL/water-sugar solutions are measured and buffered to pH=11-12 as required by Reacton 1 (John Griffin G, Shu L (2004) Solvent extraction and purification of sugars from hemicellulose hydrolysates using boronic acid carriers J. Chem. Technol. Biotechnol., pp 505-511; Aziz H, Kamaruddin A, Bakar M (2008) Process optimization studies on solvent extraction with naphthalene-2-boronic acid ion-pairing with trioctylmethylammonium chloride in sugar purification using design of experiments Separation and Purification Technology, pp 190-197; herein incorporated by reference).

Organic Extractant Solutions.

An equal volume of IL-sugar-buffer solution is mixed with an organic solution containing 150 mM Aliquat 336 (Sigma-Aldrich, 0.884 g/cm$^3$) and 70 mM boronic acid. Napthelene-2-boronic acid (Frontier Scientific, 97%, Batch: 14973) or phenylborinic acid (Fluka Analytical, >=97%) is dissolved in n-hexane/1-octanol (85:15, v/v) to ensure the boronic acids are completely dissolved in the organic phase (John Griffin and Shu 2004; Aziz et al. 2008).

Stripping Solutions.

An aqueous solution containing 0.5M hydrochloric acid is used to recover the sugars form the loaded organic solution.

Pretreatment and Corn Stover Hydrolysis.

300 mg of corn stover (4.8% moisture content) is mixed with 9.7 g of [C2mim][OAc] (as received, <0.2% moisture specified) in a 30 ml test tube. The contents are stirred with magnetic stirring at 120° C. After 3 hours, 20 ml of hot water is slowly added to the mixture with vortexing to precipitate the dissolved biomass. The resulting slurry is washed with 4×40 ml of water to remove the ionic liquid and re-suspended in 50 mM sodium acetate buffer, pH 4.8. Novazyme cellulase cocktail (NS50010 and NS50013) are added to the solution at an enzyme loading of 5% and 0.5% wt enzyme/wt glucan respectively and shaken at 250 rpm for 72 hours. The hydrolysate solution is then filter sterilize and stored at 4° C. until used.

An IL free hydrolysate product is used to specify the amount of IL present for extraction trials. The known concentrated glucose hydrolysate solution is then spiked with varying amounts of IL: 5%, 10% and 15% IL (v[C2mim][OAc]/v hydrolysate) and then extracted using the procedure described herein in the section titled "Extraction and stripping of sugars".

Extraction and Stripping of Sugars.

The extraction of sugars is similar to the method deccribed by Griffin and Shu (John Griffin and Shu 2004) with several modifications (e.g. [C2mim][OAc] content). This method is used for synthetic sugar extraction as well as the hydrolysate glucose extraction. Extraction experiments are conducted separately for each sugar (glucose, xylose and cellobiose) and hydrolysate sugar solution. Equal volumes of varying IL/water (0 to 100% IL) sugar solutions and organic extractant solutions (both defined above 2.1 and 2.2) are vigorously mixed at 1400 rpm, 25° C., for 2 hours (Eppendorf Thermomixer). Tubes are then transferred to a centrifuge (Eppendorf Centrifuge 5434) and spun at 13000 rpm for 5 minutes to separate the two phases. Samples of the IL/water phase are then analyzed using High Performance Anion Exchange Chromatography (HPAEC) to determine amount of sugars transferred into the organic phase. Stripping trials are conducted the same way by taking the loaded organic phase and vigorously mixing it with an equal volume of stripping solution (0.5M HCl, mixing for 30 minutes and spun down in centrifuge for 5 minutes, 13 000 rpm). Samples are taken and analyzed (HPAEC) from the stripped aqueous phase to determine the amount of sugars recovered from the loaded organic phase. All experiments are performed at 25° C.

Sugar concentrations are measured using High Performance Anion Exchange Chromatography with Pulsed Amperometric Detection (HPAEC-PAD) on a Dionex DX600 equipped with a Dionex Carbopac PA-20 analytical column (3×150 mm) and a Carbopac PA-20 guard column (3×30 mm) (Dionex, Sunnyvale, Calif., USA). Eluent flow rate is 0.4 ml/min and the temperature is 30° C. A gradient consisting of a 12 min elution with 14 mM NaOH followed by a 5 min ramp to 450 mM NaOH for 20 min, then a return to the original NaOH concentration of 14 mM for 10 min prior to the next injection.

Results and Discussion

Extraction of Sugars.

All trials are conducted in triplicates and one standard deviation above and below the mean is represented in FIGS. 1-7. Percent extracted is defined as the percentage of sugar, on a mole or mass basis, initially present in the IL or IL/water phase that is transferred into the organic phase:

Equation 4: % Extracted equation for calculating sugars transferred from the IL phase into the organic phase.

$$\% \text{ Extracted} = \frac{([Sugar]_{initial} - [Sugar]_{final})}{[Sugar]_{initial}} \times 100$$

Figure 2:
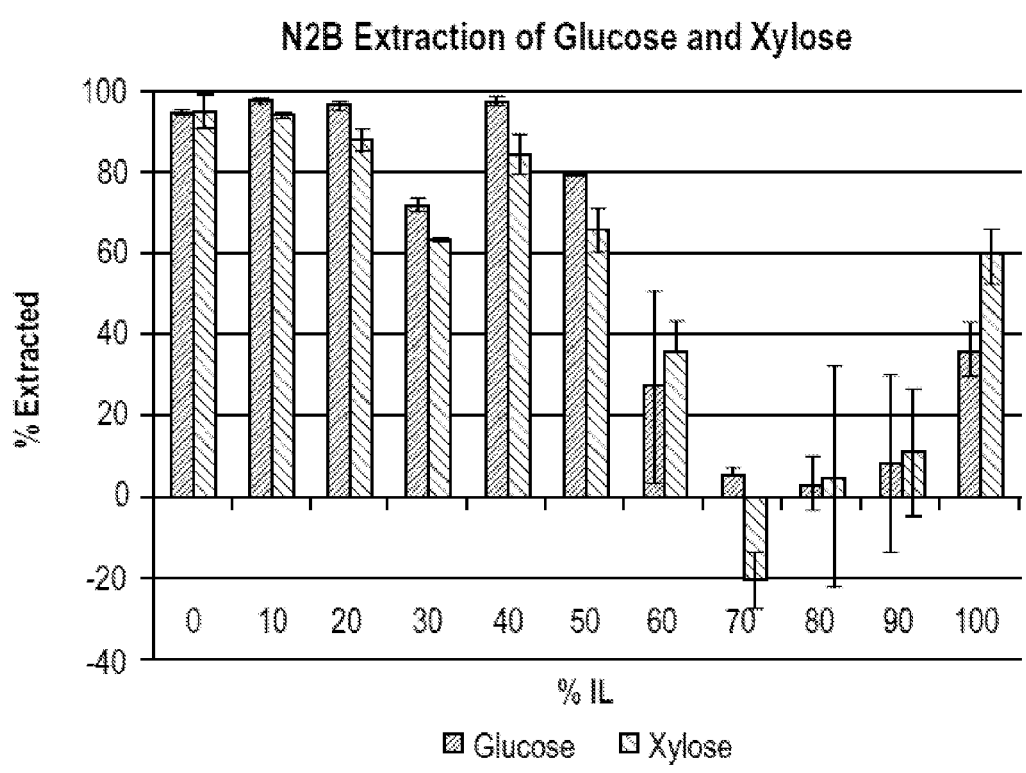
FIG. 2 shows napthalene-2-boronic acid extraction of glucose and xylose from aqueous [C2mim][OAc] solutions. N2B has a slightly greater affinity for glucose, no significant trend is observed with increasing IL concentration. At concentrations over 60% IL, no sugar recovery occurs.
Figure 3:
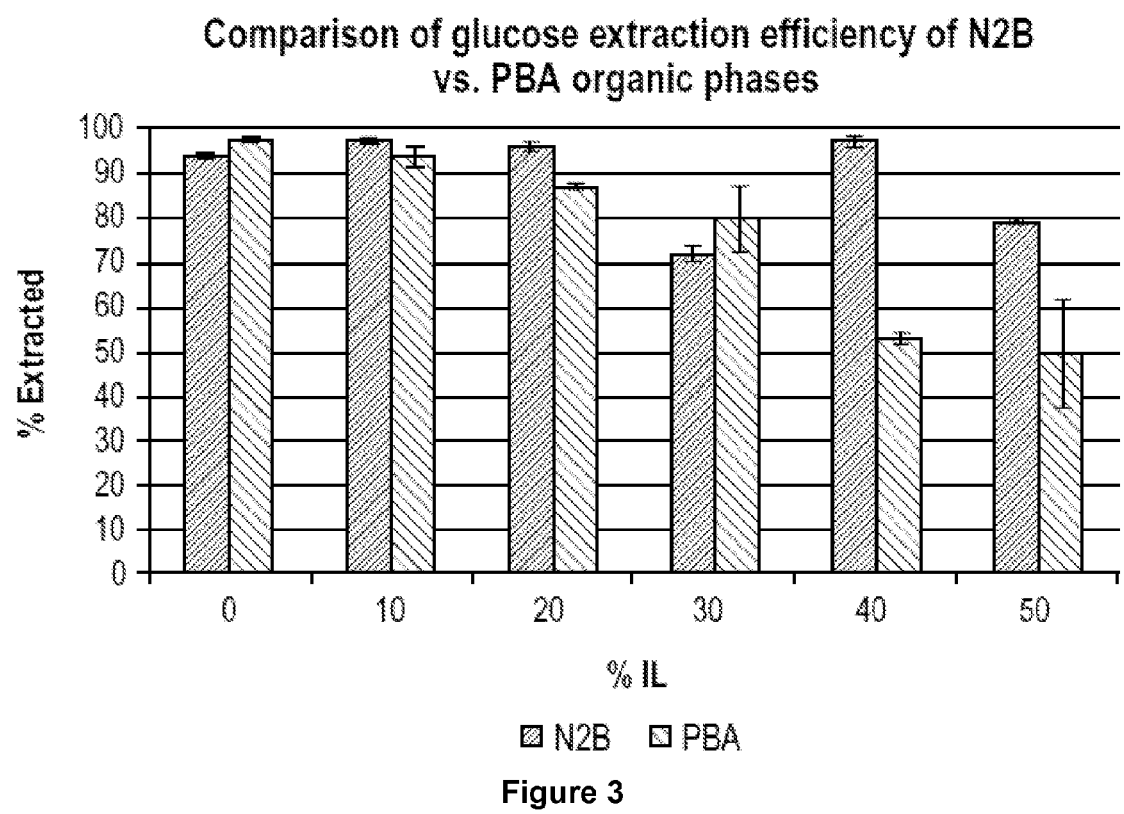
FIG. 3 shows glucose extraction comparing napthalene-2-boronic acid (N2B) and phenylboronic acid (PBA). Both extractants recover similar amounts from IL concentrations 0% to 30% IL. From 40-50% IL N2B has a higher affinity for glucose.
Figure 4:
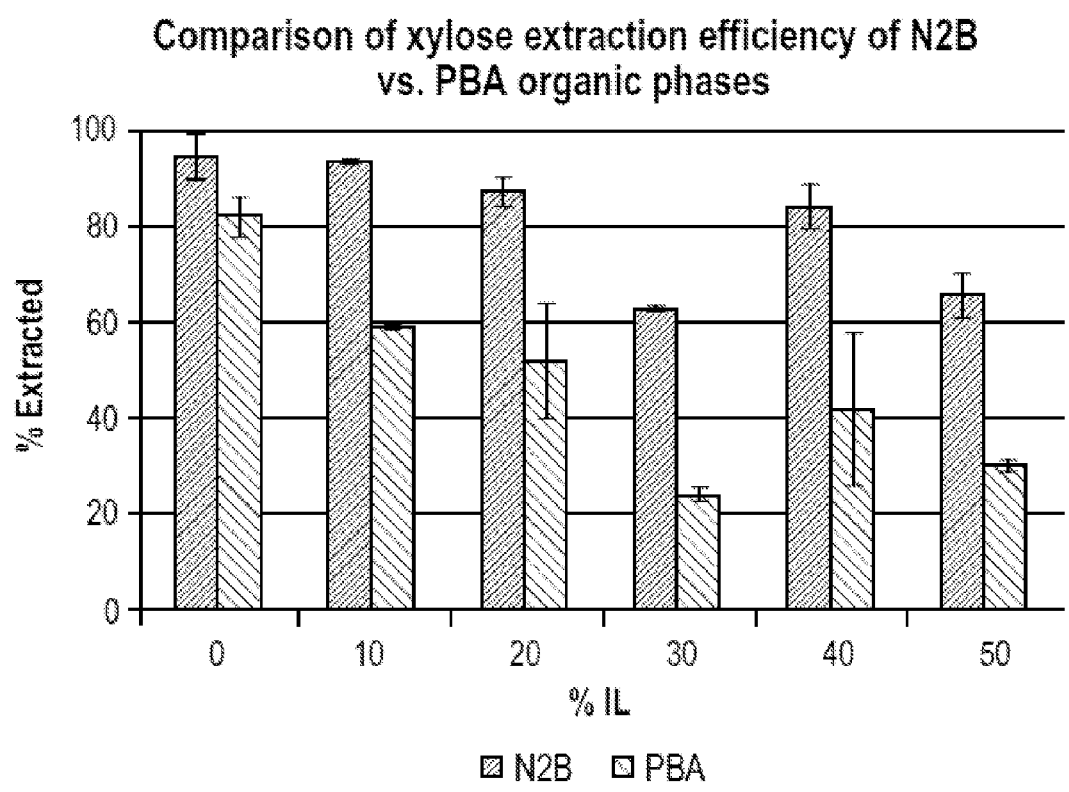
FIG. 4 shows xylose extraction comparing napthalene-2-boronic and phenylboronic acids. N2B has a higher affinity for xylose than PBA in all IL concentrations from 0-50%.
Figure 5:
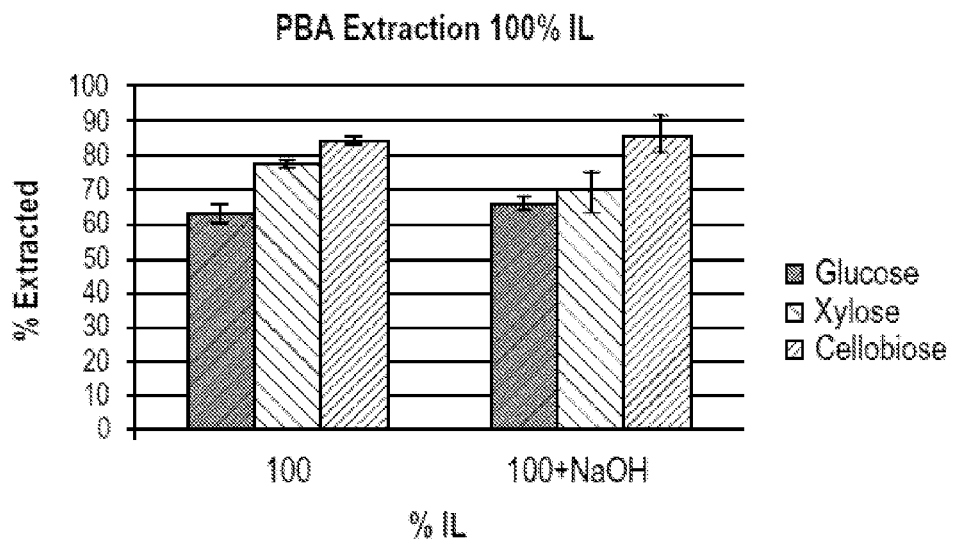
FIG. 5 shows phenylboronic acid extraction of glucose, xylose and cellobiose in 100% IL and 100% IL spiked with NaOH. Cellobiose is extracted greater than both monosaccharides
Figure 6:
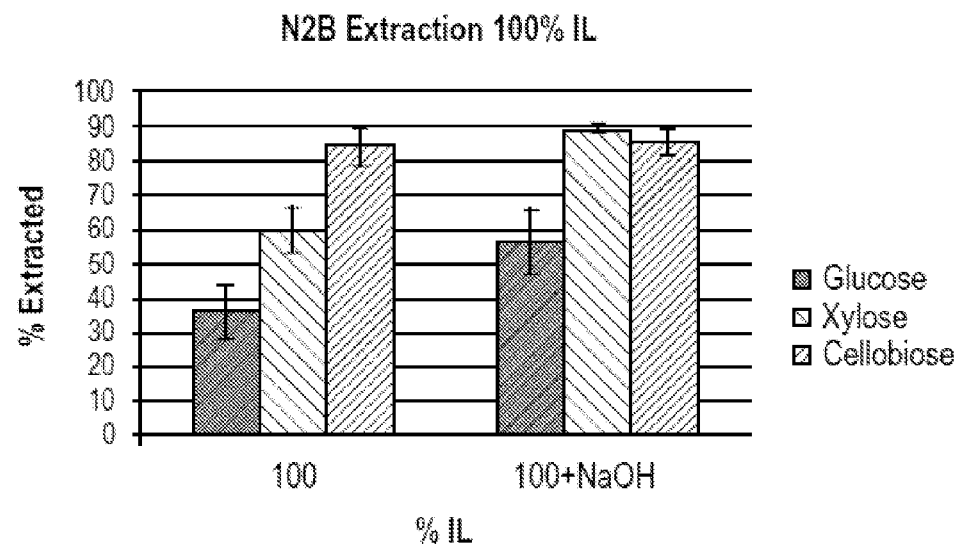
FIG. 6 shows napthalene-2-boronic acid extraction of glucose, xylose and cellobiose in 100% IL and 100% IL spiked with NaOH. Here the increase in hydroxide concentration is increased the extraction ability in all three sugars.

For both N2B and PBA, glucose is recovered more effectively (higher % extracted) than xylose for IL/water solutions from 0 to 50% IL seen in FIGS. 1 and 2. Between the two boronic acids, N2B had a higher affinity for xylose than PBA. For glucose, a clear trend is inconclusive in the region from 0 to 30% IL, but N2B had greater extraction percentages than PBA in 40% and 50% IL (FIG. 3). Negligible amounts of cellobiose are extracted by PBA or N2B in the 0 to 50% IL region. (See Table 1) For IL/water solutions containing 60%-90% IL negligible amounts of all three sugars are extracted.

TABLE 1

Extraction data for each sugar at varying amounts of ionic liquid.

| | Average % Extr | | | SD | | |
|---|---|---|---|---|---|---|
| % IL | Glucose-N2B | Xylose-N2B | Cellobiose-N2B | Glucose-N2B | Xylose-N2B | Cellobiose-N2B |
| 0 | 94 | 95 | 0 | 1 | 4 | 3 |
| 10 | 97 | 93 | 0 | 1 | 0 | 28 |
| 20 | 96 | 87 | −1 | 1 | 3 | 0 |
| 30 | 72 | 63 | 12 | 2 | 0 | 26 |
| 40 | 97 | 84 | −8 | 1 | 5 | 2 |
| 50 | 79 | 66 | 9 | 0 | 5 | 26 |
| 60 | 27 | 35 | −10 | 23 | 8 | 3 |
| 70 | 5 | −21 | 9 | 2 | 7 | 26 |
| 80 | 3 | 5 | −23 | 7 | 27 | 2 |
| 90 | 8 | 11 | −17 | 22 | 16 | 22 |
| 100 | 36 | 60 | 84 | 7 | 6 | 5 |
| 100 + NaOH | 56 | 89 | 87 | 9 | 1 | 2 |
| | Glucose-PBA | Xylose-PBA | Cellobiose-PBA | Glucose-PBA | Xylose-PBA | Cellobiose-PBA |
| 0 | 97 | 82 | 30 | 0 | 4 | 23 |
| 10 | 94 | 59 | 11 | 2 | 1 | 4 |
| 20 | 87 | 52 | 17 | 1 | 12 | 33 |
| 30 | 80 | 24 | 20 | 7 | 1 | 34 |
| 40 | 53 | 42 | 9 | 1 | 16 | 24 |
| 50 | 49 | 30 | −12 | 12 | 1 | 13 |
| 60 | −13 | 15 | −3 | 6 | 22 | 16 |
| 70 | 8 | −8 | −29 | 25 | 6 | 3 |
| 80 | −14 | −24 | −33 | 4 | 8 | 29 |
| 90 | 8 | 11 | 1 | 2 | 16 | 22 |
| 100 | 63 | 77 | 84 | 3 | 1 | 1 |
| 100 + NaOH | 66 | 69 | 85 | 2 | 6 | 5 |

The average value is taken from triplicate samples and standard deviation (SD) is shown. Negative extraction values correspond to greater final sugar content than initial, which could be due to experimental error or issues addressed in the results section. Positive controls of known initial starting solutions are conducted and validated. Initial sugar concentrations are 10 mM prior to extraction, and the organic phase contained 70 mM boronic acid. Solutions are at pH 11-12 and ambient temperature.

Solutions containing 100% ionic liquid produced unexpected results. In both the straight 100% [C2mim][OAc] and the spiked (addition of NaOH) 100% [C2mim][OAc], not only are all three sugars extracted to a significant amount (>60% extracted in PBA) but, cellobiose is extracted higher than both xylose and glucose (over 80% in FIGS. 2 and 3). According to Equation 1, hydroxide ions are required for the conversion of boronates to the tetrahedral anion formation. However, in the 100% IL solution no buffer (NaHCO$_3$ pH=11) is present to provide for this transformation. Hence, the boronic acids alone, without conversion to the tetrahedral form, possibly formed a stable species with the sugars in the organic phase without the need for the tetrahedral anion form. In addition, original 100% IL solutions that are spiked with NaOH did show greater extraction (see N2B FIG. 6). Hence the formation of the tetrahedral anion increases extraction capabilities in a pure IL system, but is not necessarily required for the recovery of sugars in this unique pure IL case.

Extraction of Glucose from Pre-Treated Corn Stover.

Figure 7:
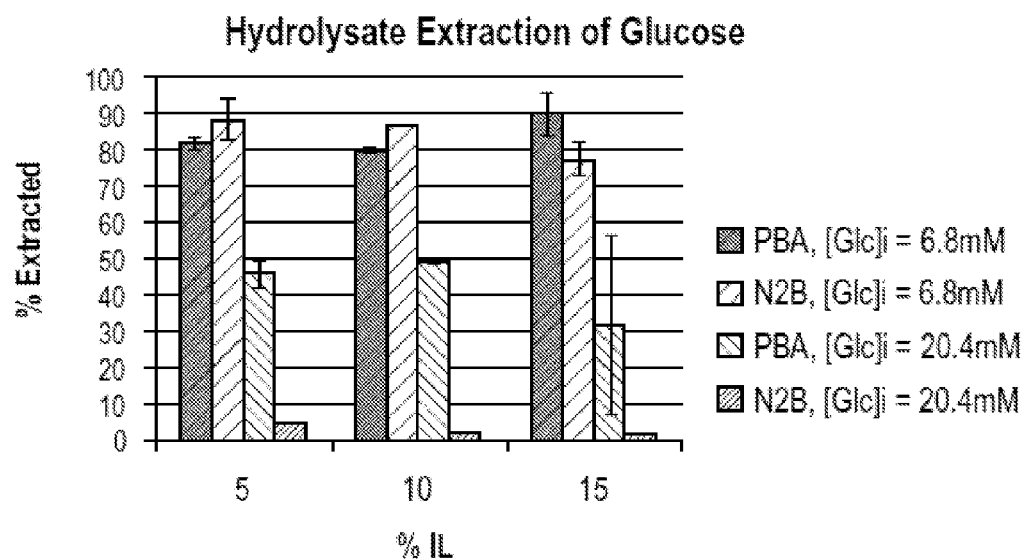
FIG. 7 shows hydrolysate extraction of glucose from pre-treated corn stover in the presence of IL. Two initial glucose concentrations are tested keeping the boronic acid concentration constant (70 mM). Both extractants are able to extract over 80% of the glucose.

Both N2B and PBA extractants are able to extract 80-90% of the original glucose contained in the hydrolysate solution (FIG. 7). There is no clear trend of % extracted with increasing ionic liquid content (5%-15% [C2mim][OAc]). However, a more concentrated original glucose solution (20.4 mM glucose vs. 6.8 mM) is tested alongside to view the maximum sugar removal from the hydrolysate solution keeping the concentration of boronic acids constant with the synthetic sugar trials (70 mM). As shown in FIG. 7, % extraction is dependent on boronic acid concentration in the organic phase for effective sugar removal. In the 20.4 mM glucose trials there is substantially more sugars present than boronic acid carriers. Hence, the removal of sugars from an IL or IL/water phase depends on the boronic acid concentration in the organic phase.

Recovery of Glucose from Corn Stover Hydrolysates.

Figure 8:
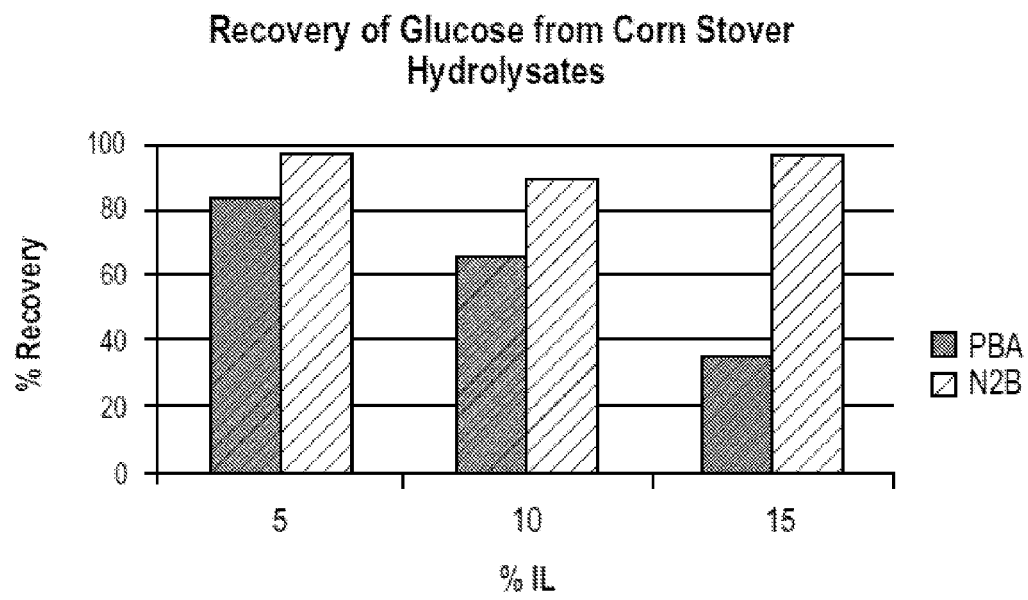
FIG. 8 shows the recovery of glucose from loaded organic phase using concentrated HCl stripping solution. For hydrolysate samples extracted with N2B up to 97% of sugars are recovered with carrying IL concentration. Initial sugar concentration is 6.8 mM glucose.

The recovery of glucose from corn stover hydrolysate samples reached up to 97%. Samples extracted with N2B showed the highest recovery % (where recovery % is defined as the percentage of sugars in the organic phase that is transferred to the stripped solution) compare to samples treated with PBA. Samples treated with PBA had a decrease in % recovery with increasing IL content. Alternatively, samples extracted with N2B recovered 90-97% of glucose from the loaded organic phase regardless of IL content (FIG. 8). Therefore, this stripping technique provides a process to efficiently deliver fermentable sugars extracted from pretreated hydrolysate solutions.

Equation 5: % Recovery equation for calculation of sugars removed from the loaded organic phase into the stripped phase $$\% \ Recovery = \frac{([Sugar]_{organic\ phase} - [Sugar]_{stripped\ phase})}{[Sugar]_{organic\ phase}} \times 100$$

Recovery of 100% IL Sugars.

Figure 11A:
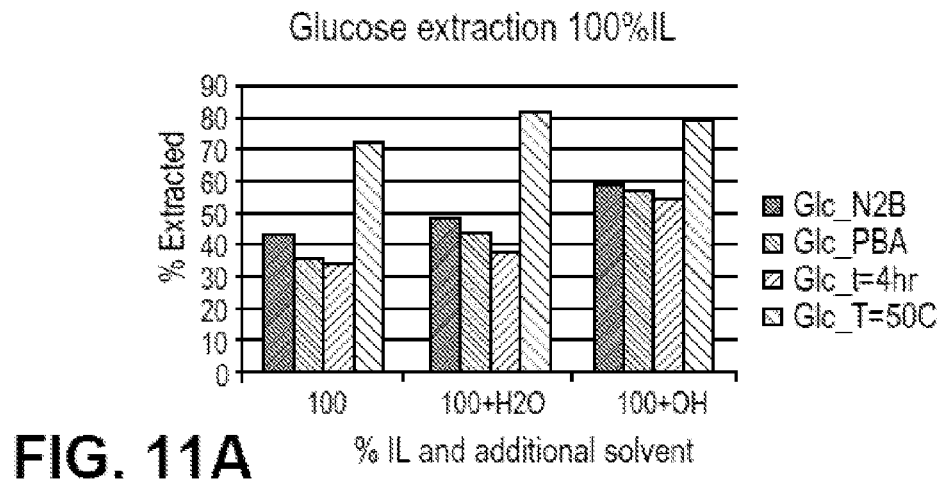
FIG. 11 shows the recovery of 100% IL sugars. Panel A shows the extraction of glucose. Panel B shows the extraction of xylose. Panel C shows the extraction of cellobiose.
Figure 11B:
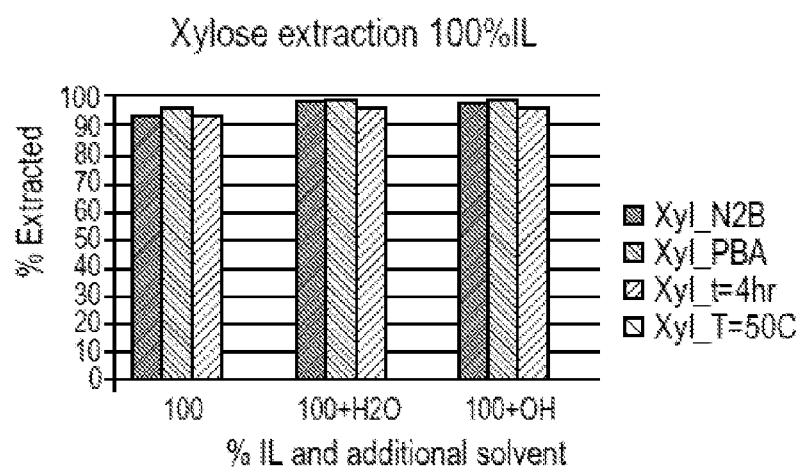
Figure 11C:
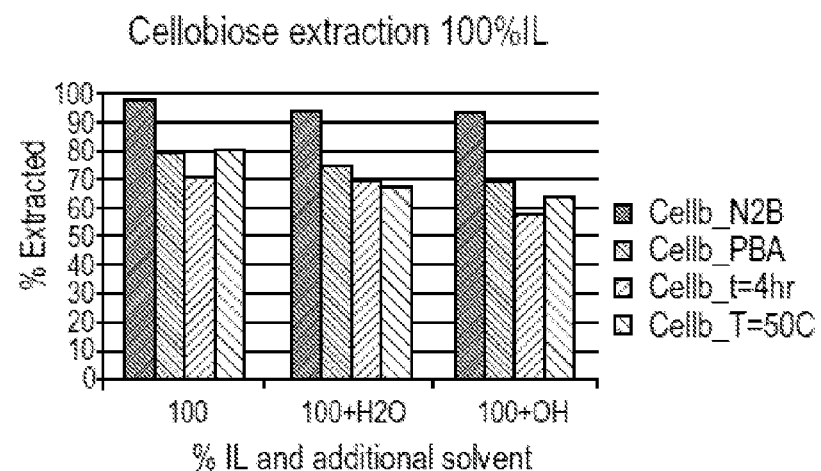

100% IL solutions with straight solid sugar dissolved into IL are teated to determine if true 100% IL sugars could be extracted. Results show glucose, xylose and cellobiose are extractable using 100% IL solution (FIG. 11). Further, increasing the mixing up to 4 hours does not incrase the yield, while increasing the temperature to 50° C. significantly increases the yield for glucose.

CONCLUSION

The extraction of mono and disaccharides in IL based systems using boronic acids is shown to be an effective technology for the delivery of fermentable sugars from pretreated biomass. This extraction technology has never before been applied to an IL system and now offers many possibilities for further work in the removal of sugars, such as C5 and C6 sugars, from IL treated systems. The high percentage of cellobiose extracted in 100% IL leads to further investigation of polysaccharide separation from IL pretreated material. Furthermore, the possibility of boronic acid membrane based systems can also be applied to pretreated biomass in future processing applications.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A composition comprising a solution comprising (a) an ionic liquid (IL) or ionic liquid-aqueous (ILA) phase, wherein the IL or ILA phase comprises a cellulase, and (b) an organic phase, wherein the solution comprises a sugar and a boronic acid.

2. The composition of claim 1, wherein the organic phase comprises a sugar-boronic acid complex.

3. The composition of claim 1, wherein the sugar is a 6-carbon monosaccharide, 5-carbon monosaccharide, or a cellobiose.

4. The composition of claim 1, wherein the IL or ILA phase has a pH of more than about 9.

5. The composition of claim 4, wherein the IL or ILA phase has a pH equal to or greater than 10, 11, or 12.

6. The composition of claim 1, wherein the organic phase comprises an organic molecule that is immiscible with the IL and ILA solutions, and the organic molecule does not react with the boronic acid and the sugar.

7. The composition of claim 1, wherein the IL or ILA phase comprises 1-alkyl-3-alkylimidazolium alkanate, 1-alkyl-3-alkylimidazolium alkylsulfate, 1-alkyl-3-alkylimidazolium methylsulfonate, 1-alkyl-3-alkylimidazolium hydrogensulfate, 1-alkyl-3-alkylimidazolium thiocyanate, or 1-alkyl-3-alkylimidazolium halide, or a mixture thereof, wherein an "alkyl" is an alkyl group comprising from 1 to 10 carbon atoms, and an "alkanate" is an alkanate comprising from 1 to 10 carbon atoms.

8. The composition of claim 1, wherein the IL or ILA phase comprises 1-ethyl-3-methylimidazolium acetate (EMIN Acetate), 1-ethyl-3-methylimidazolium chloride (EMIN Cl), 1-ethyl-3-methylimidazolium hydrogensulfate (EMIM HOSO$_3$), 1-ethyl-3-methylimidazolium methylsulfate (EMIM MeOSO$_3$), 1-ethyl-3-methylimidazolium ethylsulfate (EMIM EtOSO$_3$), 1-ethyl-3-methylimidazolium methanesulfonate (EMIM MeSO$_3$), 1-ethyl-3-methylimidazolium tetrachloroaluminate (EMIM AlCl$_4$), 1-ethyl-3-methylimidazolium thiocyanate (EMIM SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM HOSO$_3$), 1-butyl-3-methylimidazolium methanesulfonate (BMIM MeSO$_3$), 1-butyl-3-methylimidazolium methylsulfate (BMIM MeOSO$_3$), 1-butyl-3-methylimidazolium tetrachloroaluminate (BMIM AlCl$_4$), 1-butyl-3-methylimidazolium thiocyanate (BMIM SCN), 1-ethyl-2,3-dimethylimidazolium ethylsulfate (EDIM EtOSO$_3$), Tris(2-hydroxyethyl)methylammonium methylsulfate (MTEOA MeOSO$_3$), 1-methylimidazolium chloride (MIM Cl), 1-methylimidazolium hydrogensulfate (MIM HOSO$_3$), 1,2,4-trimethylpyrazolium methylsulfate, tributylmethylammonium methylsulfate, choline acetate, or choline salicylate, or a mixture thereof.

9. The composition of claim 1, wherein the IL is of a concentration of more than 0% to less than 60% of the composition or solution.

10. The composition of claim 1, wherein the boronic acid has the formula: R-α-B(OH)$_2$ (I); wherein α is a bond or an alkyl or alkenyl chain of 1-10 carbons, R comprises at least 1 aromatic ring.

11. The composition of claim 10, wherein R comprises 1, 2, or 3 aromatic rings.

12. The composition of claim 10, wherein R is a benzene.

13. The composition of claim 12, wherein the benzene comprises 1 or 2 methyl groups.

14. The composition of claim 11, wherein R is a naphthalene.

15. The composition of claim 10, wherein at least one aromatic ring is substituted by one or more alkyl groups comprising 1-10 carbons.

16. The composition of claim 10, wherein α is a bond or an alkyl or alkenyl chain of 1-4 carbons.

17. The composition of claim 16, wherein α is a bond or an alkyl or alkenyl chain of 1-2 carbons.

18. The composition of claim 17, wherein α is a —C=C—.

19. The composition of claim 1, wherein the boronic acid is phenylboronic acid, 3,5-dimethylphenylboronic acid, 4-tert-butylphenylboronic acid, trans-β-styreneboronic acid, or naphthalene-2-boronic acid, or a mixture thereof.

20. A method of removing a sugar from a solution, comprising: (a) providing a solution comprising (i) an ionic liquid (IL) or ionic liquid-aqueous (ILA) phase and (ii) an organic phase, wherein the solution comprises an ionic liquid, a sugar and a boronic acid, wherein the providing step (a) comprises: (i) introducing a cellulase to the IL or ILA phase comprising a cellulose, such that the cellulase hydrolyzes the cellulose to produce the sugar, and (ii) mixing the IL or ILA phase and the organic phase comprising the boronic acid to produce the solution; (b) contacting the sugar with the boronic acid to form a sugar-boronic acid complex, and (c) separating the organic phase and the aqueous phase, wherein the organic phase contains the sugar-boronic acid complex.

21. The method of claim 20 further comprising: (d) separating the sugar from the organic phase.

22. The method of claim 21, wherein the (d) separating step comprises adding a second IL, ILA, or aqueous solution comprising a stripping agent to the organic solution, such that the sugar-boronic acid complex dissociates and the sugar moves into the second IL, ILA, or aqueous solution.

23. The method of claim 22, wherein the stripping agent is an acid which decreases the pH of the organic phase.

24. The method of claim 20, wherein the (a) providing step comprises contacting (i) an IL or ILA solution and an organic solution.

25. The method of claim 20, wherein the IL or ILA solution comprises an ionic liquid (IL) and the sugar.

26. The method of claim 20, wherein the organic solution comprises the boronic acid.

27. The method of claim 26, wherein the organic solution further comprises an organic solvent which ensures the boronic acid is fully dissolved in the organic phase.

28. The method of claim 27, wherein the organic solvent is n-hexane or 1-octanol, or a mixture thereof.

29. The method of claim 20, wherein the (b) contacting step comprises having the sugar and the boronic acid in the solution to essentially come to equilibrium.

30. The method of claim 29, wherein the (b) contacting step comprises increasing the contact between the sugar in the IL or ILA phase and the boronic acid in the organic phase.

31. The method of claim 21, wherein the (d) separating step further comprises separating the second IL, ILA, or aqueous solution from the organic phase.

32. The method of claim 21 further comprising: (e) culturing a cell using the sugar obtained from the (d) separating step.

33. The method of claim 20, wherein the IL or ILA phase comprises a biomass comprising the sugar.

34. The method of claim 33, wherein the biomass is a cellulose biomass, hemicellulose biomass, ligno-cellulose biomass, or a mixture thereof.

35. The composition of claim 1, wherein the sugar is cellobiose.

36. The method of claim 20, wherein the sugar is cellobiose.

* * * * *